R. H. Jewett,
Armor Clad.
N° 37,695. Patented Feb. 17, 1863.
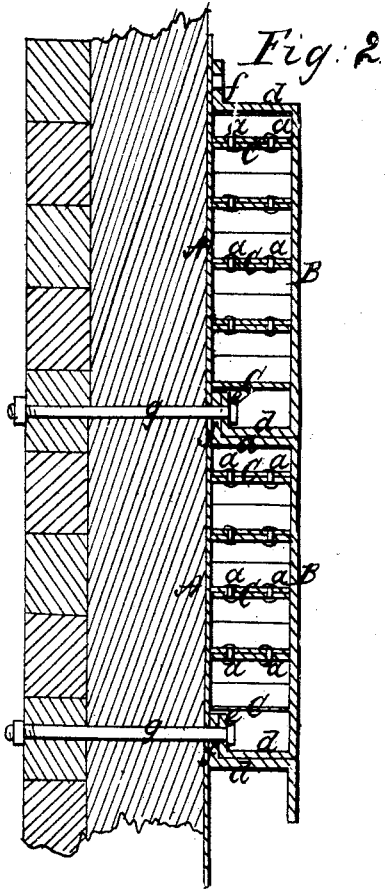
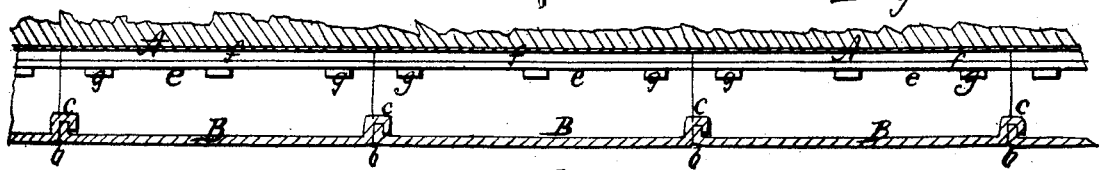
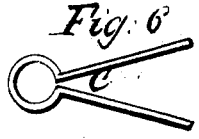
Witnesses
Inventor
R. H. Jewett

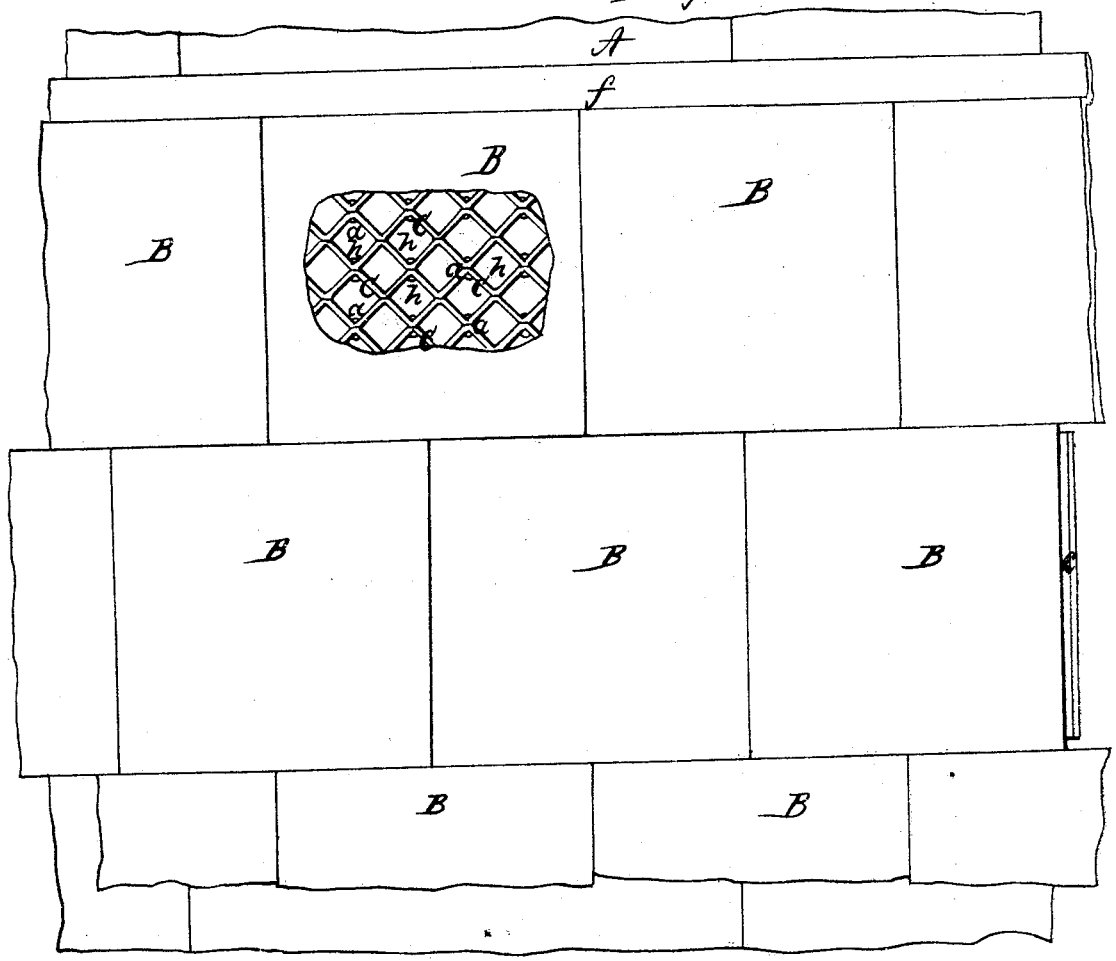

UNITED STATES PATENT OFFICE.

R. H. JEWETT, OF MOUNT STERLING, ILLINOIS.

IMPROVED DEFENSIVE ARMOR FOR SHIPS' AND OTHER BATTERIES.

Specification forming part of Letters Patent No. 37,695, dated February 17, 1863.

*To all whom it may concern:*

Be it known that I, R. H. JEWETT, of Mount Sterling, in the county of Brown and State of Illinois, have invented a new and useful Improvement in Defensive Armor for Vessels; and I do hereby declare that the following is a full, clear, and exact description of the same, reference being had to the accompanying drawings, forming part of this specification, in which—

Figure 1 is a face view of part of the side of a vessel having my armor applied and showing one of the other plates broken to expose the interior to view. Fig. 2 is a transverse vertical section of the same. Fig. 3 is a horizontal section of the armor.

Similar letters of reference indicate corresponding parts in the several figures.

To enable others to make and apply my invention, I will proceed to describe its contruction and operation.

A A, Figs. 1, 2, and 3, are the inner plates, attached closely to the sides of the vessel by suitable bolts, and having their edges fitted together in any suitable and convenient manner. B B are the other plates, and C C interposed plates or strips of metal set edgewise between A A and B B. The plates or strips C C are of a width equal to that of the intended space between the plates A A and B B, and of any convenient length, and are corrugated and furrowed, as shown in Fig. 1, and riveted together, as shown at $a\ a$ in that figure. The plates B B have each one of their vertical edges turned in square, as shown at $b$ in Fig. 1, and the other turned in square and doubled, as shown at $c$, to form a double lap-joint with the edge $b$ of the next one, and have their upper and lower or horizontal sides both turned in square, as shown at $d\ d$ in Fig. 2, and flanges $e\ f$ formed upon them, the flange $e$ on the lower side being turned inward, and that, $f$, on the upper side turned outward, and the flange $e$ of each is made to lap over the flange $f$ of the one below it. The parts $d\ d$ are made of a depth to cause the plates or strips C C, when set edgewise between A and B, to be clamped between them by the bolts $g\ g$, which attach B B to the vessel, the said bolts passing through the flanges $e$ and $f$ and through the slide D of the vessel, as shown in Fig. 2, and being secured by nuts inside. By this construction of the plates B B they are made to constitute boxes for the reception of the plates or strips C C, and the bolts are protected from projectiles. The spaces $h\ h$ between the plates or strips C C are made to constitute air-cells, and the metal forming each of the said spaces is made to form a hollow column, presenting its ends in the direction to resist the impact of projectiles.

What I claim as my invention, and desire to secure by Letters Patent, is—

Having the filling-plates C made in corrugated form, united at the angles $a$ and placed endwise and clamped between the plates A B, as herein shown and described, so that independent air-chambers $h$ will be formed by said plates, while the plates C will resist all exterior pressure on their ends, like pillars, thus securing great strength and buoyancy, all as set forth.

R. H. JEWETT.

Witnesses:
CHAS. V. IRWIN,
M. ALLEN.